Feb. 15, 1927.
A. E. ERICKSON
1,617,997
HARROW
Filed May 22, 1925    2 Sheets-Sheet 1
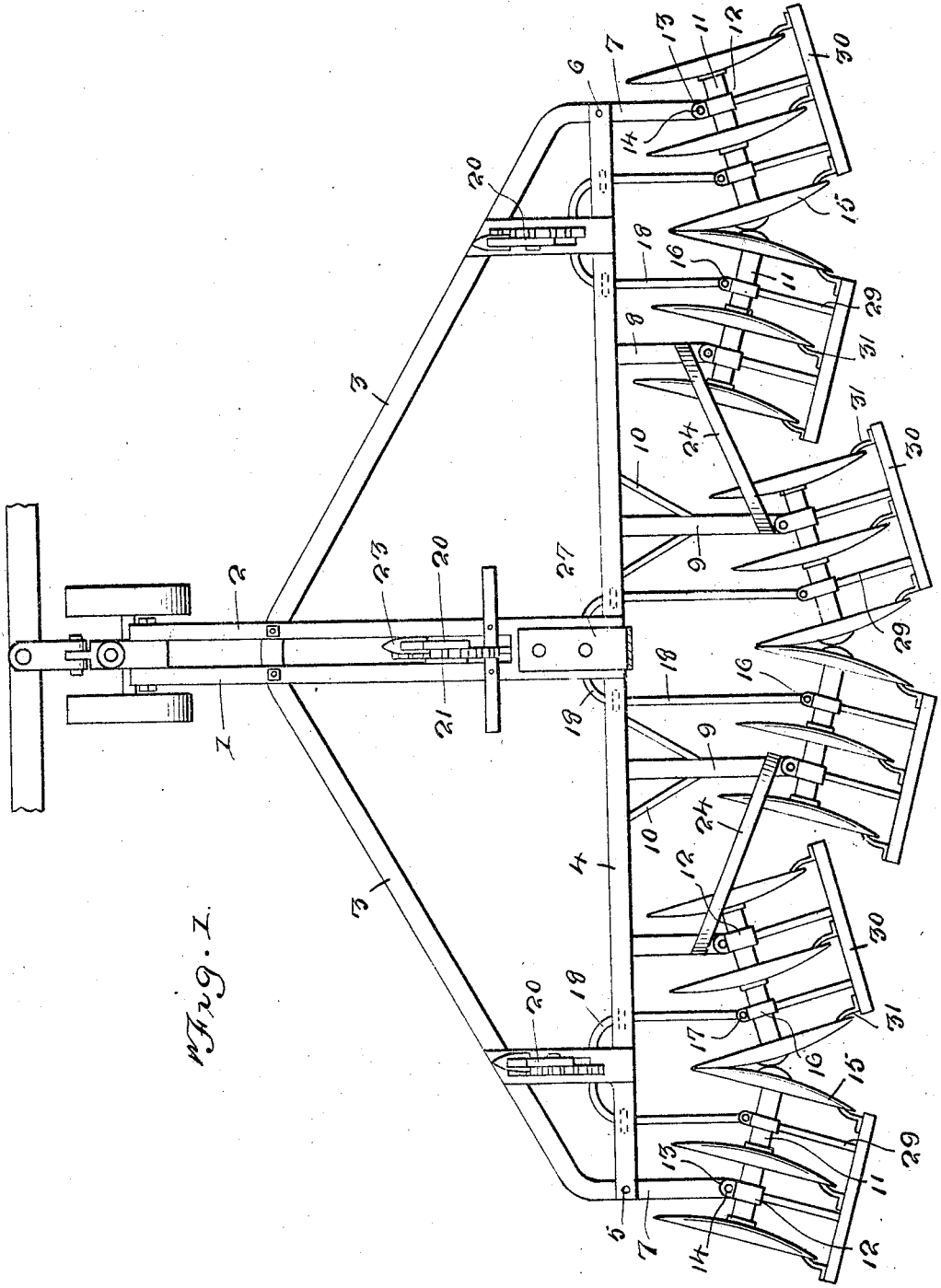
Arthur E Erickson INVENTOR
BY Victor J. Evans
ATTORNEY

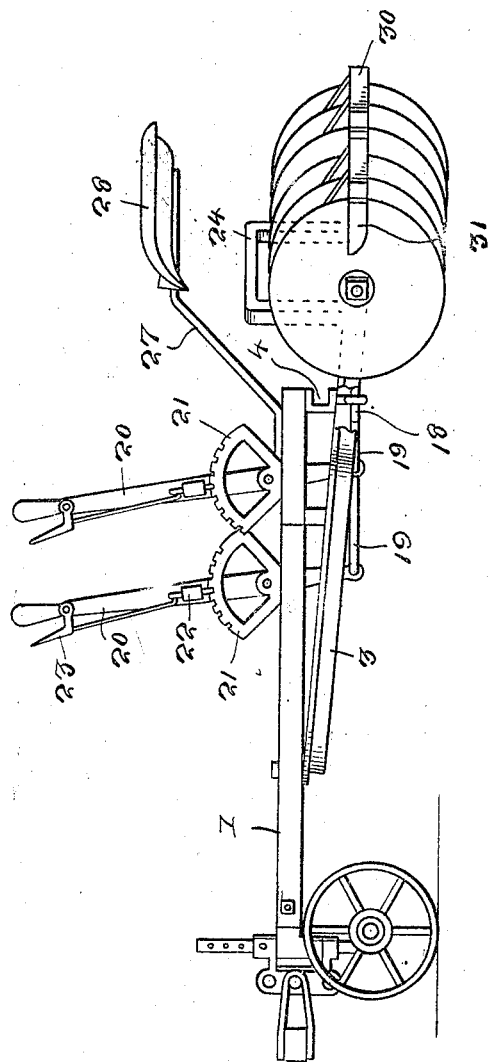

Patented Feb. 15, 1927.

1,617,997

UNITED STATES PATENT OFFICE.

ARTHUR EMANUEL ERICKSON, OF ROCKHAM, SOUTH DAKOTA.

HARROW.

Application filed May 22, 1925. Serial No. 32,144.

This invention relates to agricultural implements and more particularly to a disk harrow.

The primary object of the invention is to provide a disk harrow adapted to thoroughly disintegrate soil such as corn stubble ground and the like and condition the same with one harrowing, so as to put the ground in proper condition for planting small grain such as wheat and rye.

A further object is to provide a disk harrow whereby the disks thereof are arranged in companion groups with each group adjustable with respect to its companion group and the line of travel of the implement.

Another object is to provide a disk harrow constructed in such a manner whereby the respective disks thereof have a tendency to hold the ground at all times.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a top plan view of the harrow which forms the subject matter of the present invention.

Figure 2 is a side elevation thereof.

Referring to the drawings in detail the frame which forms the body portion of the implement includes a pair of parallel spaced elongated angle irons 1 and 2, and a substantially V-shaped angle iron 3 which is reinforced adjacent its ends with a cross beam 4 which is secured to the V-shaped angle iron as at 5 and 6.

Extending rearwardly from the cross beam 4 there are a plurality of extensions arranged in end pairs 7 and 8 and a central pair 9, the central pair being substantially longer than the end pairs for a purpose which will be apparent as the description continues. The end extensions of the end pairs 7 and 8 form the continuation of the V-shaped angle irons as shown in Figure 1 and these extensions are bent to be arranged parallel with each other. The central pair 9 is reinforced through the medium of braces 10 which converge from the cross beam 4 and having their adjacent ends fixed to the central pair of extensions as clearly shown in Figure 1 of the drawings.

A rotatably mounted shaft of the form as shown at 11 is associated with each extension through the medium of bearings 12 which surround the shaft adjacent one end thereof and are provided with ears 13 pivotally secured to the extensions by pivot bolts 14. Each of the shafts 11 has fixed thereon in spaced relation with respect to each other a plurality of disks 15 of the usual construction adapted for disk harrows and which rotates with the shafts as will be apparent.

As above stated the shafts 11 are associated with the outer ends of the extensions which are arranged in pairs, the natural consequences being that the shafts together with the group of disks on each shaft are also arranged in pairs and to control the adjustment of the horizontal movement of the shafts and disks of each pair there is provided a bearing collar 16 which surrounds the shafts adjacent the end opposite the connection of the bearings 12 as clearly shown in Figure 1 of the drawings. Extending from the bearing collars of each pair of shafts are ears 17 adapted to pivotally receive the ends of U-shaped members 18 and each U-shaped member has extending forwardly therefrom a rod 19 which has its forward end pivotally secured to the lower eyed end of the hand levers 20. The hand levers 20 are each provided with a quadrant 21 having rack teeth formed therein to receive the sliding pawl 22 controlled in the usual manner through the medium of the grip members 23 as shown in Figure 2 of the drawings.

By the structure thus far described it will be apparent that the angularity of the respective groups of disks can be adjusted with respect to the group of each pair and to the line of travel of the implement, and as shown in Figure 1 the group of disks are arranged in operative position.

Rising from each of the central extensions and the inner one of the end extensions is a substantially U-shaped bracket member 24 to adequately support the members at a point where the strain is greatest.

The inner ends of the elongated irons 1 and 2 at their juncture with the cross beam 4 are integrally connected and rising from this integral portion is resilient supporting means 27 for a seat 28.

The front ends of the elongated angle irons is carried by a wheeled truck of the usual construction and is adjustably associated therewith as clearly shown in Figure 2 of the drawings.

The disks are provided with the scraping means which includes arms 29 arranged in pairs and extending rearwardly from the bearings 12 and bearing collars 16 as shown in Figure 1 of the drawings. The cross strip 30 is secured to the ends of each pair of arms and extending rearwardly from each cross strip, is a plurality of scraper knives 31, one for each disk and being arranged in contacting engagement therewith.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

In an agricultural implement, a frame having a substantially V-shaped portion formed with parallel rear ends, a cross beam bridging the parallel ends adjacent their juncture with the V-shaped portion, a plurality of extensions projecting rearwardly from the cross beam and some of said extensions cooperating with the parallel ends for arranging the ends and extensions collectively in parallel pairs and the inner pair being longer than the outer pairs, ground engaging elements having connection with the ends and extensions, means for adjusting the ground engaging members and U-shaped bracket members having their arm portions rising from and connected to the free ends of the adjacent extensions of the inner and outer pairs.

In testimony whereof I affix my signature.

ARTHUR ERICKSON.